Jan. 22, 1957     F. L. KIRBY     2,778,221
VIBRATION TESTING ATTACHMENT FOR AIRCRAFT ENGINES
Filed Feb. 18, 1955

Forrest L. Kirby
INVENTOR.

BY *Clarence A. O'Brien*
*and Harvey B. Jackson*
Attorneys

United States Patent Office 2,778,221
Patented Jan. 22, 1957

2,778,221

VIBRATION TESTING ATTACHMENT FOR AIRCRAFT ENGINES

Forrest L. Kirby, Hamlin, Tex.

Application February 18, 1955, Serial No. 489,173

4 Claims. (Cl. 73—70)

This invention relates to testing apparatus, and more particularly to a novel attachment for use in combination with aircraft engines in testing these engines for vibration.

The primary object of the present invention resides in the provision of a novel device which facilitates the attachment of a vibration tester to an aircraft engine in the testing of this engine for excessive or unwanted vibrations.

A further object of the invention resides in the provision of an attachment for use in vibration testing which will serve to facilitate the transmission of the vibrations to the vibration tester and which may be easily attached and detached using a novel cam locking means.

The construction of this invention features the use of a stud which is threadedly engaged in a suitable threaded recess in an aircraft engine and which may be left in position so that when it is desired, the attachment including a standard with the vibration tester secured thereto and cam locking means may be readily attached and detached, as desired.

Still further objects and features of this invention reside in the provision of a vibration testing attachment for aircraft engines and the like that is simple in construction, strong, durable, and highly efficient in use.

These, together with the various ancillary objects and features of the invention which will become apparent as the following description proceeds, are attained by this vibration testing attachment, a preferred embodiment of which has been illustrated in the accompanying drawings, by way of example only, wherein.

Figure 1:
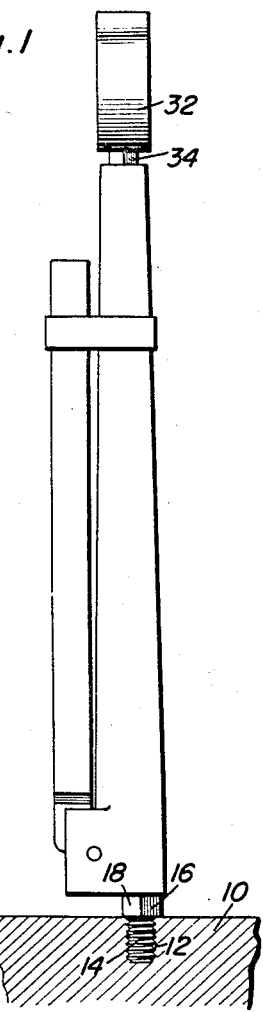
Figure 1 is a side elevational view of the vibration testing attachment shown secured on a portion of an engine block, with the portion of the engine block being shown in section for detail.
Figure 2:
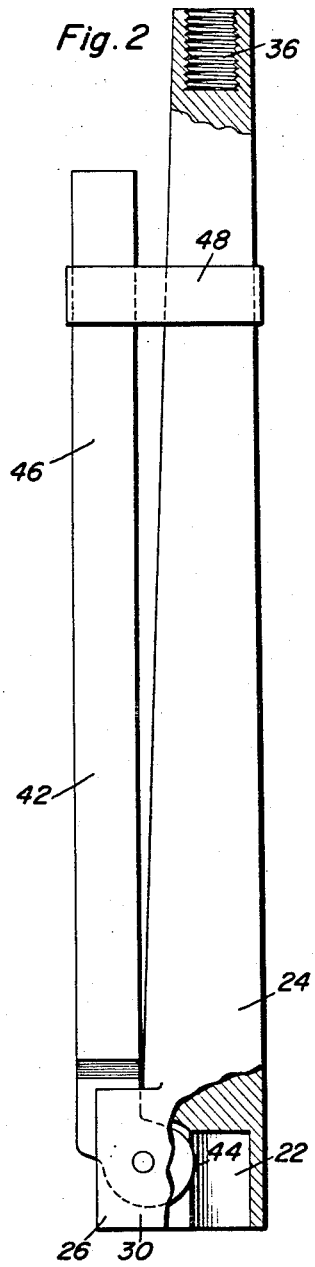
Figure 2 is an enlarged elevational view of the vibration testing attachment with parts thereof being broken to show the construction of other parts more clearly.
Figure 3:
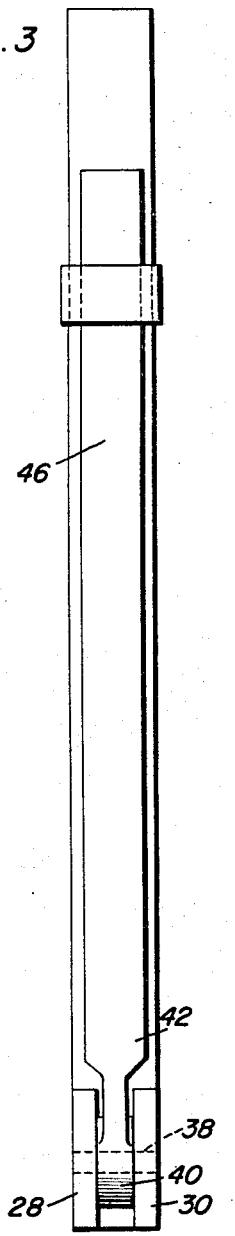
Figure 3 is an end elevational view of the standard and associated cam locking means and locking ring.
Figure 4:
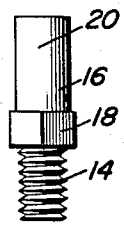
Figure 4 is an enlarged elevational view of the stud comprising one of the elements of the invention.

With continuing reference to the accompanying drawings wherein like reference numerals designate similar parts throughout the various views, reference numeral 10 generally designates an engine block which may be provided with a threaded recess 12 therein in which the threaded end portion 14 of a stud 16 can be secured. The stud 16 may be provided with a headed portion 18 so as to facilitate the rotation thereof using any convenient wrench or other tool. The upper portion of the stud 16 may be of any convenient shape, and is indicated at 20.

The upper end 20 of the stud 16 is receivable within a cavity 22 of a standard 24 having a bifurcated portion 26 in alignment with the cavity 22 forming furcations 28 and 30. The standard 24 is of suitable length to properly transmit the vibrations properly to a vibration meter 32 which is provided with an end portion 34 capable of being threaded into the internally threaded portion 36 at the opposite end of the standard 24 from the cavity 22.

By means of a pin or shaft 38, a cam end portion 40 of a cam locking lever 42 is rotatably secured between the furcations 28 and 30 of the bifurcated portion 26 of the standard 24. The cam locking lever 42 has a cam surface, as at 44, which is adapted to extend into the cavity 22 so as to engage the end portion 20 of the stud 16 to thereby lock the stud to the standard 24 and the assembly including the vibration meter 32. The cam locking lever 42 has a handle portion 46 extending upwardly and generally coextensive with the standard 24. A locking ring 48 is slidably received about the standard 24 and the handle 46 of the locking lever 42 so as to enable the locking lever 42 to be held in a locked position with the cam surface 44 engaging the end 20 of the stud 16.

In operation, with the loop 48 disengaged from the cam locking lever 42, the standard 24 may be slid over the upper end 20 of the stud 16.

Then, the cam locking lever 42 can be actuated so as to cause the locking surface 44 to engage the upper end 20 of the stud 16. Then, the locking ring 48 can be slid over the handle portion 46 of the cam locking lever 42 to hold the cam locking lever 42 in position. Vibration from the engine block 10 will, of course, then be transmitted by the standard 24 to the meter 32.

The foregoing is considered as illustrative only of the principles of the invention. Further, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A vibration testing attachment comprising a threaded stud having an end portion, a standard, said standard having one end with a cavity therein and being internally threaded at the other end thereof for reception of a vibration meter, and cam locking means pivotally connected to said standard for locking said standard on said end portion of said stud with said end portion extending into said cavity, said cam locking means extending into said cavity to engage said end portion of said stud.

2. A vibration testing attachment comprising a threaded stud having an end portion, a standard, said standard having one end with a cavity therein and being internally threaded at the other end thereof for reception of a vibration meter, and cam locking means pivotally connected to said standard for locking said standard on said end portion of said stud with said end portion extending into said cavity, said cam locking means extending into said cavity to engage said end portion of said stud, said standard having a bifurcated portion adjacent said cavity and in alignment therewith, said cam means including a cam lever pivotally mounted between the furcations of said bifurcated portion.

3. A vibration testing attachment comprising a threaded stud having an end portion, a standard, said standard having one end with a cavity therein and being internally threaded at the other end thereof for reception of a vibration meter, and cam locking means pivotally connected to said standard for locking said standard on said end portion of said stud with said end portion extending into said cavity, said cam locking means extending into said cavity to engage said end portion of said stud, and a locking ring received over said standard for holding said cam locking means in a locked position.

4. A vibration testing attachment comprising a threaded stud having an end portion, a standard, said standard having one end with a cavity therein and being internally threaded at the other end thereof for reception of a vibration meter, and cam locking means pivotally connected to said standard for locking said standard on said end portion of said stud with said end portion extending into said cavity, said cam locking means extending into said cavity to engage said end portion of said stud, said standard having a bifurcated portion adjacent said cavity and in alignment therewith, said cam means including a cam lever pivotally mounted between the furcations of said bifurcated portion, said locking ring being received over said cam lever in embracing relation therewith.

References Cited in the file of this patent

UNITED STATES PATENTS

| | | |
|---|---|---|
| 928,370 | Feickert | July 20, 1909 |
| 1,401,991 | Lehr | Jan. 3, 1922 |
| 2,408,547 | Bertschinger | Oct. 1, 1946 |
| 2,583,004 | McCorkle | Jan. 22, 1952 |